June 5, 1956  C. H. CORMACK  2,748,500
EDUCATIONAL APPLIANCE
Filed July 6, 1951  2 Sheets-Sheet 1

INVENTOR
CLARA H. CORMACK

June 5, 1956     C. H. CORMACK     2,748,500
EDUCATIONAL APPLIANCE

Filed July 6, 1951     2 Sheets-Sheet 2

INVENTOR
CLARA H. CORMACK

BY

United States Patent Office 2,748,500
Patented June 5, 1956

2,748,500

EDUCATIONAL APPLIANCE

Clara H. Cormack, Lake Park, Fla.

Application July 6, 1951, Serial No. 235,490

1 Claim. (Cl. 35—70)

The present invention relates to an educational appliance for instructing children in primary grades the basic fundamentals of arithmetic, and more particularly has reference to means for teaching children or backward adults the principles of addition and subtraction in a fashion which may be quickly and readily grasped by persons of this particular mental level.

While, of course, there have heretofore been proposed various types of procedures for instructing children the fundamentals, so to speak, of addition and subtraction by the medium of illustrative material correlating the numbers with pictorial representations denoting the numbers, these prior practices have not been totally satisfactory, in that they are rather expensive procedures or too complex to be easily grasped by a child. Accordingly, an important object of the present invention is to provide a means of instructing young children addition and subtraction in a manner which retains the child's attention and thus tends to clearly impress the basic principles upon the child.

Broadly speaking, the invention comprises a plurality of cards, certain of the cards bearing the Arabic numerals, other of the cards having pictorial representations thereon corresponding in number to the Arabic numerals, and further cards having present thereon the word corresponding to each Arabic numeral. The particular cards are adapted to be used in various matching schemes and are particularly efficacious for instructing pupils attending the first grade of primary school.

The inventive concept further embodies a plurality of sectional cards, certain of the sections being foldable relative to other sections, each section having pictorial indicia thereon, the other section including Arabic numerals associated with the pictorial representations. More specifically, there are two separate sets of these cards, one being for instructions in addition and the other for subtraction. In the addition set, the sum total of the pictorial representations corresponds to the sum total of the Arabic numerals present on the section bearing such Arabic numerals, the pictorial objects and the Arabic numerals being arranged in the same sequence.

Another object of my invention is to provide a unique card system for instructing young children in addition and subtraction which is relatively simple in structural detail and which can be easily and inexpensively manufactured.

A further object of the invention is to provide a card system for instructing or teaching children of primary school level the fundamentals of addition and subtraction which can be readily employed by schools without the necessity of purchasing any particular type of equipment to enable the teacher to use the cards for instructional purposes.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which.

Figure 1:
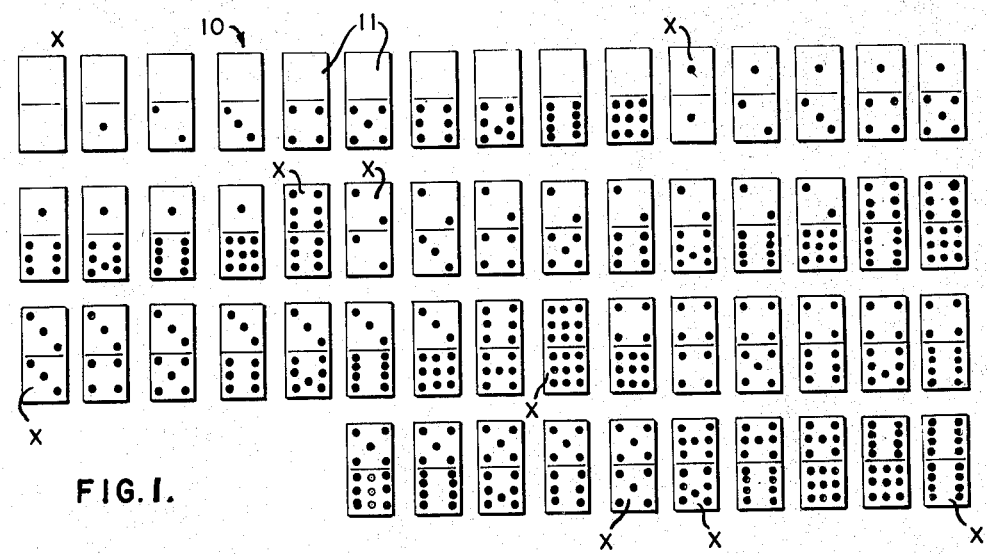
Figure 1 is a plan view of a plurality of cards showing the manner in which the pictorial representations are arranged on the cards.

As shown in Figure 1, the instruction set comprises fifty-five individual cards, each card being identified 10, and this set is employed for teaching addition. The cards identified X are doubles and each presents a single fact. Of the remaining forty-five cards, each presents two facts, thereby providing one hundred numeral facts or combinations, as will later be more fully described. Each card card 10 includes a central panel 11 and end panels 12 and 13, the end panels being connected to the central panel along fold lines 14 and 15, respectively. In the showing of Figure 1, the central panel 11 is illustrated with the end panels being folded beneath the central panel, although Figure 2 clearly illustrates the card in its entirety. The central panel 11, that is to say face A of that panel is provided with a pictorial representation 16, which representation denotes a particular number. As manifest from Figure 2, the pictorial representation includes two spaced apart dots located above a horizontal line and three spaced dots below the line to indicate visually that the sum total of the dots would be 5. On the complemental face A of the panel 13 it will be noted that superposed Arabic numerals 2 and 3 appear above the horizontal line with the total 5 below the line. In other words, this panel indicates the numeral 2 corresponds to the dot arrangement above the horizontal line of panel 11 and the numeral 3 corresponds to the dots below the line, and the numeral 5 indicates the sum total of the dots. Hence, by repeatedly showing these particular panels to a child, he will associate the two dots with the Arabic numeral 2, the three dots with the Arabic numeral 3 and that the total of this particular dot arrangement corresponds to the Arabic numeral 5. Manifestly, the complemental sides of the other cards are similarly arranged and no further elaboration is thought necessary.

The face A of the panel 12 is depicted by the middle card of Figure 2, and it can be seen that this panel carries the superposed Arabic numerals 3 and 2 above the horizontal line with the numeral 5 below. In other words, the central panel 11 has been reversed and the dot arrangement is now three dots above the horizontal line with two dots below this line. Consequently, it will be appreciated that one face of the composite card presents two numerical facts, namely that two objects above the horizontal line added to three objects below the line total 5, while three objects above the horizontal line and two objects below the line likewise total 5. Hence, the child learns that the arrangement or disposition of the individual objects above or below a line does not alter or vary the sum total of these objects.

In using the cards, they may be suspended from a cord or wire 17 by placing the fold line over the wire. When it is desired to teach the child the total of the numerals 2 plus 3, the card is suspended in the fashion shown by the left hand card of Figure 2, and after the children have grasped the point in issue, the card may be suspended in the manner shown by the middle card. The child has now presumably learned the two combinations to produce the numeral 5, insofar as the numerals 2 and 3 are concerned, and to test the child's knowledge, the card is reversed and corresponds in the manner shown by the right hand card wherein face B of panel 11 corresponds to face A, while face B of panels 12 and 13 correspond to face A of the same panels, except that the total of the Arabic numerals has been omitted and it is up to the child to furnish this information.

It is also possible to use the cards without the pictorial indicia being visible, and in this situation, one of the end panels can be suspended over the wire so that that panel will cover the dot arrangement. For example, the face A of end panel 12 would cover the face B of panel 11, this end panel being the total of 3 plus 2, while face B of panel 13 would be visible below the panel 12, this panel showing the numerals 2 plus 3 but not depicting the sum total. Presumably, an alert child after having dots and Arabic numerals associated to produce a particular sum when the dots and numerals are located in a certain arrangement will come to associate the Arabic numerals with a given total, and since the total of the dots and the numerals denoting the dots does not change, regardless of their particular arrangement, the child will be able to realize that 2 plus 3 corresponds to 3 plus 2 and that the total is 5.

This same procedure can be followed with all of the cards and the cards can be suspended in six different positions on the wire 17 to indicate the various combinations, although the sum of the information is, that regardless of the arrangement above and below the line of the dots and regardless of the arrangement of the Arabic numerals, the total will be the same. Of course the only exception to this rule is for the ten double cards where the dots above and below the line are the same.

Figure 2:
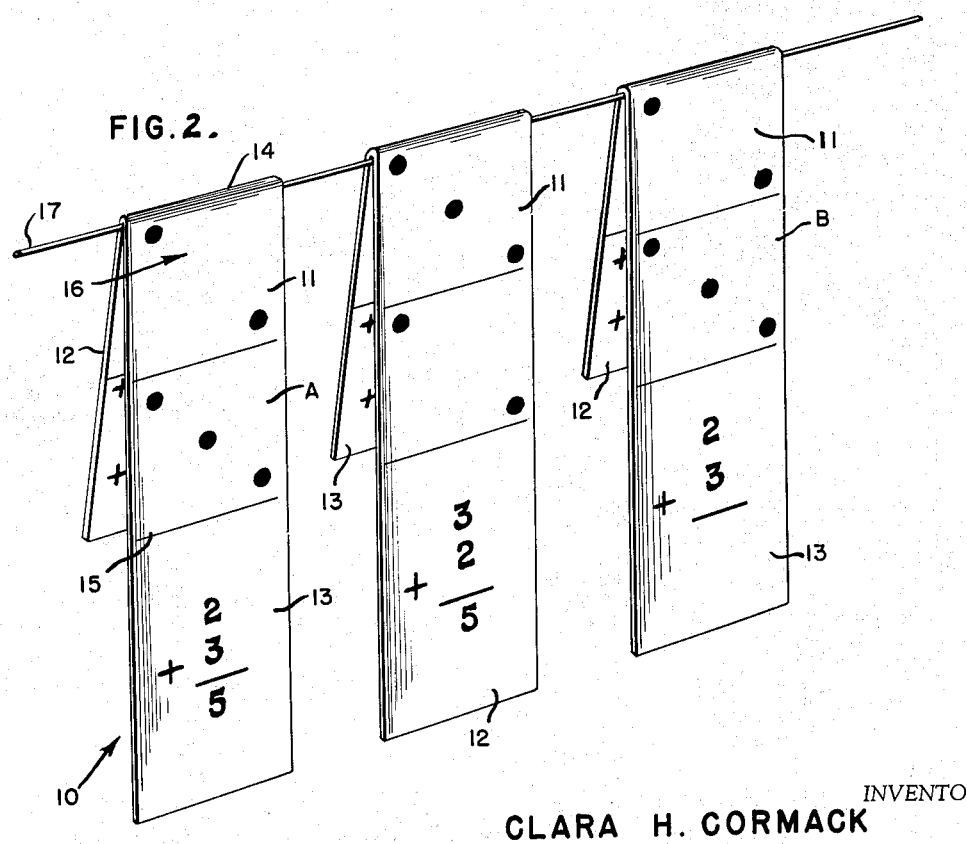
Figure 2 is a view in perspective illustrating the manner in which the cards are employed to instruct children in addition, the instruction being in connection with the sum of the numerals 2 and 3.
Figure 3:
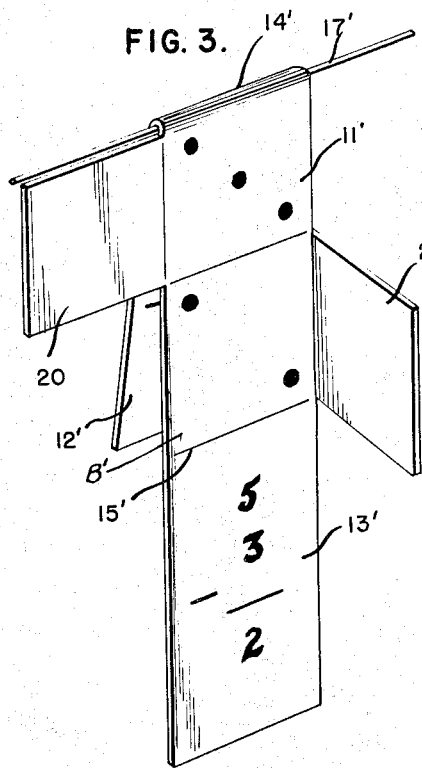
Figure 3 is a view in perspective of the card employed for use in instructing subtraction, the card illustrating the difference between the Arabic numerals 3 and 2.

The set of cards for teaching subtraction is similar to that shown in Figures 1 and 2 and corresponding parts will bear the same reference numerals except they are primed and a typical card for use in this connection is illustrated in Figure 3. The only difference between the subtraction card and the addition card is that central panel 11' is provided with a pair of tabs 20 and 21, the tabs extending at right angles from opposite sides of the panel 11'. The tabs are of such dimensions as to cover completely one-half of the central panel 11' and, as a consequence, the dot arrangement carried by the central panel. In using the subtraction cards, the card is suspended in the fashion shown in Figure 3 wherein the dot arrangement in the central panel 11' has the three dots above the line and two dots below the line. The panel 13' carries the Arabic numerals 5, 3, the minus sign and the numeral 2 below the horizontal line. Hence, the sum total of the dots in the central panel 11' will correspond to the topmost numeral of the panel 13' or, in other words, in this particular instance the numeral 5. By moving the flap or tab 20 to cover the upper half of the panel 11', the two dots present below the line are visible and these dots are the same as the numeral below the line in the lower panel 13'.

By inverting the card so that the dot arrangement will be two above and three below the line in the central panel, it can be seen that the end panel 12' has the Arabic numerals 5, 2, the minus sign and the numeral 3 falling below the line. Hence, when the tab or flap 21 is moved to conceal the two dots, the remaining half of the central panel will display the three dots which corresponds to the Arabic numeral below the line in the end panel 12'. Consequently, the student after seeing the card thus used for a number of times, learns that when the 2 is subtracted from 5, the answer is 3, and when 3 is subtracted from 5, the remainder is 2.

To test the child's knowledge, the card is reversed to present the face B' and the dot arrangement in the panel 11' is similar to that shown in Figure 2. However, end panel 13' merely presents the numerals 5, 3 and the horizontal line. The teacher then moves the flap 20 to cover the three dots and if the child has properly absorbed the earlier instruction, he or she will realize that the numeral 2 should be below the horizontal line in the panel 13', since the number of dots corresponds to the difference between the numerals 5 and 3. The same procedure is followed for subtracting 2 from 5 by inverting the card and moving the flap 21 to cover the two dot arrangement of the central panel.

Here again, as was true of the addition card, by repeated use of the cards to associate in the child's mind the relationship between the dot lay-out and the Arabic numerals associated with that particular lay-out, the children can readily and easily grasp the fundamentals of both addition and subtraction, and inasmuch as the instruction is in the nature of a game, so to speak, the children take considerable interest in the instruction.

While the pictorial features of both the addition and subtraction cards are in the form of dots, it is, of course, to be understood that other characters could be employed, particularly ones which are attractive to children, such as flowers, fruits, etc.

Figure 4:
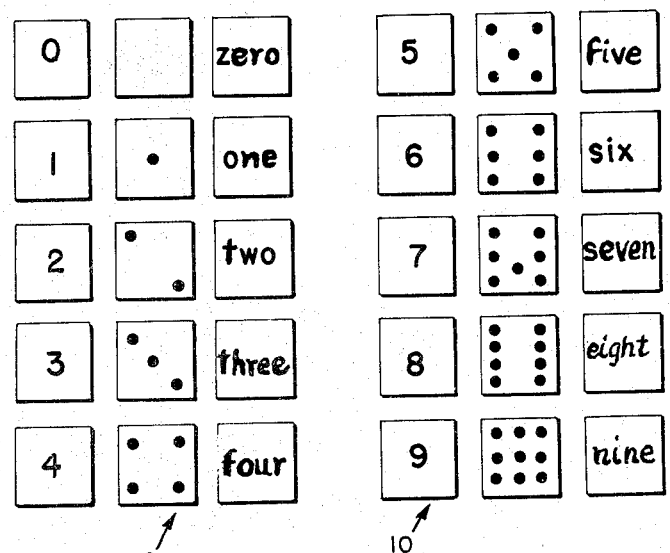
Figure 4 is a plan view of a further set of cards which may be used for children of the age level of the first grade of primary school.
Figure 5:
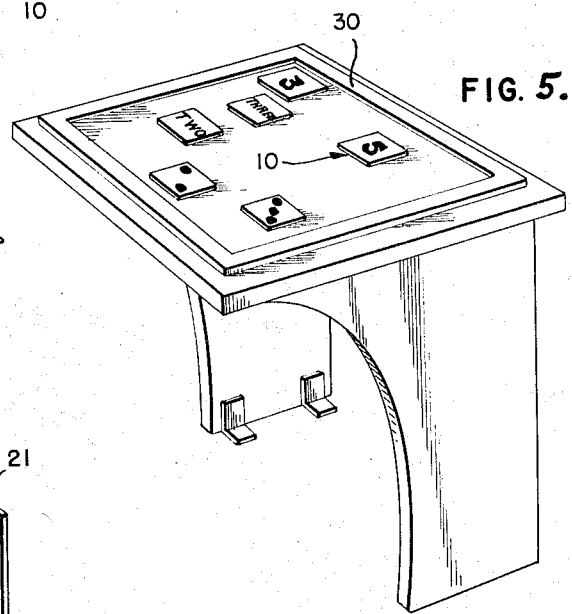
Figure 5 is a view in perspective depicting the manner in which the cards shown in Figure 4 may be used.

The card arrangement described is preferably used by children who have reached the second grade in primary school since by that time the numerals present on all of the cards have been studied. In the first grade, the cards shown in Figure 4 are probably more desirable in most schools, and, in addition, the cards work very well with the wall charts present in the majority of schools. These particular cards are separate entities and may be placed on a blackboard such as shown at 30 on the student's desk. After the child has learned the basic patterns, any two cards can be attached together by paper clips or the like in order to familiarize the child with the type of card illustrated in Figures 1 to 3. For example, the cards bearing two dots and three dots could be connected together to indicate the addition of 2 and 3 and the like. The cards bearing the Arabic numerals are employed after the child has become familiar with the numeral and dot arrangements.

This invention is not to be confined to any strict conformity with the showing in the drawing but may be changed or modified so long as such changes or modifications mark no material departure from the salient features of the invention as expressed in the appended claim.

I claim:

A card for use in teaching addition and subtraction to children comprising three panels of the same dimensions connected along fold lines, the central panel having pictorial matter thereon depicting at least two particular numbers, one of the end panels having at least one numeral thereon corresponding to the pictorial matter illustrating one of the numbers, the other end panel having at least one numeral thereon corresponding to the pictorial matter illustrating the other number, and a flap on the central panel movable to conceal one of the numbers illustrated by the pictorial matter.

References Cited in the file of this patent

UNITED STATES PATENTS

| | | |
|---|---|---|
| 533,216 | Troelltsch | Jan. 29, 1895 |
| 560,964 | Barnard | May 26, 1896 |
| 711,879 | Osborn | Oct. 21, 1902 |
| 1,228,889 | Eberhart | June 5, 1917 |

FOREIGN PATENTS

| | | |
|---|---|---|
| 7,225 | Switzerland | Aug. 7, 1893 |
| 163,929 | Great Britain | June 2, 1921 |
| 554,824 | France | Mar. 10, 1923 |
| 165,862 | Switzerland | Feb. 16, 1934 |
| 63,964 | Netherlands | Aug. 15, 1949 |